H. A. FALVEY.
PUNCTURE PROOF TIRE.
APPLICATION FILED MAR. 17, 1919.

1,323,259. Patented Dec. 2, 1919.

Witness:
John Enders

Inventor.
Hugh A. Falvey,
by Robert Purne
Atty.

UNITED STATES PATENT OFFICE.

HUGH A. FALVEY, OF CHICAGO, ILLINOIS.

PUNCTURE-PROOF TIRE.

1,323,259.      Specification of Letters Patent.      Patented Dec. 2, 1919.

Application filed March 17, 1919. Serial No. 283,010.

*To all whom it may concern:*

Be it known that I, HUGH A. FALVEY, a citizen of the United States of America, and a resident of Chicago, in the county of Cook, State of Illinois, have invented certain new and useful Improvements in Puncture-Proof Tires, of which the following is a specification.

This invention relates to that class of armored pneumatic tires in which a plurality of small sections or plates of puncture resisting material are arranged in overlapping series on and between pliable sheets of woven fabric or like material to provide a puncture resisting lining or insertion for the casing of the tire, and has for its object:—

To provide a simple and efficient structural association of the aforesaid overlapping puncture resisting sections or plate in relation to each other and to their pliable carrying and inclosing webs of fabric to constitute a puncture resisting lining or insertion for the tire casing, and in which free local and independent movement between individual sections or plates can take place, with a consequent avoidance of the ordinary curling up of the margins of the sections or plates and the bending thereof in actual use, all as will hereinafter more fully appear.

In the accompanying drawings:—

Like reference numerals indicate like parts in the several views.

Figure 1:
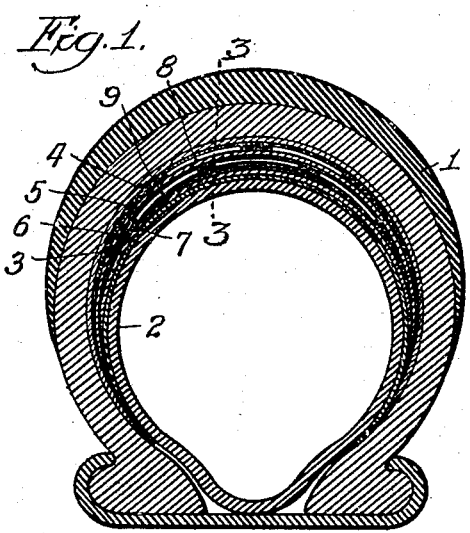
Figure 1, is a detail transverse section of a pneumatic tire having the present improvement applied as a puncture resisting lining.

Referring to the drawing, 1 designates the outer casing of a pneumatic tire, and 2 the inner air holding tube usually associated therewith.

3 designates an annular puncture resisting lining which, in the preferred form of the present invention shown in Fig. 1 is disposed loosely between the tire casing 1 and the inner tube 2, the scope of the present invention embracing the use of the present structure as an insertion in the annular crown portion of the casing 1 as usual in many of the armored tires shown in the prior art.

4, 5, 6 and 7 designate a plurality of sheets or webs of woven fabric or like pliable material arranged in superimposed relation and preferably attached together at their margins or edges by cement or other usual fastening means, with their main portions free from attachment and in loose association so as to be capable of limited independent movement in relation to each other. In the preferred form of the present invention shown in Figs. 2 and 3 the two central sheets or webs 5, 6 constitute the attaching bases for the plurality of overlapping puncture resisting sections or plates 8 and 9 hereinafter described, with the outer and inner webs 4 and 7 constituting coverings for said plurality of plates or sections.

The puncture resisting sections or plates 8 and 9 aforesaid, are of any desired shape, preferably square as shown, and provided with fastening clips, or prongs 8', 9' by which they are secured to the central carrying sheets or webs 5, 6. In the present construction each plate of each plurality of plates or sections 8 and 9 overlap an end of the next adjacent plate in the circumferential arrangement of the same in the tire casing, and such overlapping ends are provided with rounded projections or flanges 10, forming friction reducing bearings between the overlapping portions of such plates.

Figure 2:
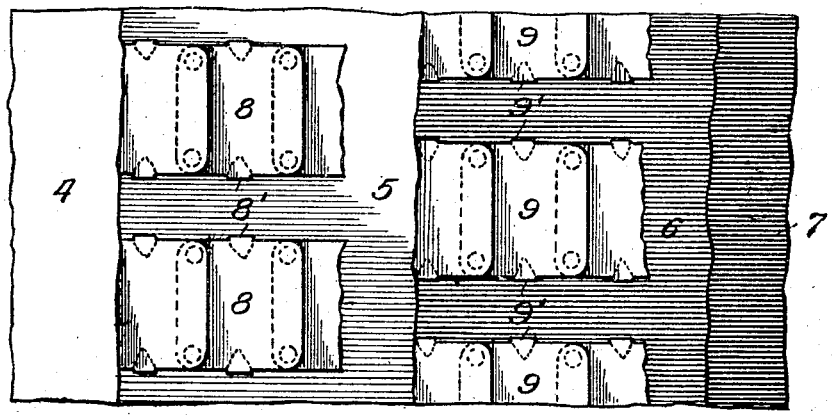
Fig. 2, is a detail plan view of the liner or insertion in an unfolded condition, and with portions of the plurality of webs and of the overlapping series of puncture resisting sections or plates removed, to illustrate the relative arrangement of said parts.
Figure 3:
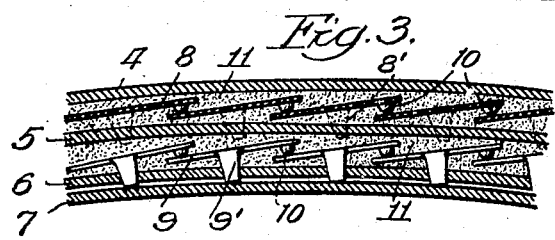
Fig. 3, is a detail longitudinal section on line 3—3, Figs. 1 and 2.

In the particular circumferential arrangement of the puncture resisting sections or plates shown in Figs. 2 and 3, one end of each individual section or plate of one plurality, overlaps the end of one adjacent section or plate and underlies the end of the other adjacent section or plate of said plurality, and with such arrangement it only requires the provision of a flange or rounded projection 10 upon one of the engaging ends of two adjacent sections or plates.

11 designate fillings of elastic material arranged in and between the plurality of overlapping sections or plates 8, 9 and adapted to provide an even bearing surface for the contacting of the adjacent sheets or webs 4 and 7 aforesaid. In the practical carrying out of the present invention; the fillings 11 may be of vulcanizable material, which after application in the manner above stated is vulcanized in place in any ordinary manner.

Having thus fully described my said in- vention what I claim as new and desire to secure by Letters Patent, is:—

1. A puncture resisting lining or insertion for pneumatic tires comprising, a plurality of superimposed sheets of pliable material, and outer and inner pluralities of puncture resisting plates carried by said sheets in transversely spaced relation with the plates of one plurality overlying the spacing of the other plurality, the individual plates of each plurality overlapping each other with adjacent ends in sliding contact and provided with bearing projections or flanges, substantially as set forth.

2. A puncture resisting lining or insertion for pneumatic tires comprising, a plurality of superimposed sheets of pliable material, and outer and inner pluralities of puncture resisting plates carried by said sheets in transversely spaced relation with the plates of one plurality overlying the spacing of the other plurality, the plates of each plurality having oblique relation to each other with an end of each plate overlapping a next adjacent plate and with the other end underlying an end of another adjacent plate, and with said adjacent ends in sliding contact and provided with bearing projections or flanges, substantially as set forth.

Signed at Chicago, Illinois, this 13th day of March, 1919.

HUGH A. FALVEY.